United States Patent [19]

Dastin et al.

[11] Patent Number: 4,764,238

[45] Date of Patent: Aug. 16, 1988

[54] ENERGY ABSORBING FOAM-FABRIC LAMINATE

[75] Inventors: Samuel J. Dastin, Hicksville; Carlos M. Cacho-Negrete, Rock Point; John Mahon, Huntington; Leonard M. Poveromo, Northport; Nicholas Corvelli, Smithtown; Arnold London, Sayville, all of N.Y.

[73] Assignee: Grumman Aerospace Corporation, Bethpage, N.Y.

[21] Appl. No.: 27,118

[22] Filed: Mar. 16, 1987

Related U.S. Application Data

[63] Continuation of Ser. No. 768,589, Aug. 23, 1985, abandoned.

[51] Int. Cl.$^4$ .............................. C09J 5/02; C09J 7/00; B32B 5/12; B32B 5/18

[52] U.S. Cl. .............................. 156/245; 156/307.3; 156/313; 264/321; 428/113; 428/114; 428/284; 428/316.6; 428/317.1; 428/319.7

[58] Field of Search ............... 264/135, 136, 137, 257, 264/321; 428/113, 114, 284, 316.6, 317.1, 317.3, 317.7, 319.1, 319.3, 319.7, 320.2, 322.7; 156/224, 245, 306.6, 306.9, 307.3, 313

[56] References Cited

U.S. PATENT DOCUMENTS

| | | | |
|---|---|---|---|
| 2,928,456 | 3/1960 | Potchen et al. | 428/317.7 |
| 3,193,437 | 7/1965 | Schafer | 428/322.7 |
| 3,193,441 | 7/1965 | Schafer | 428/322.7 |
| 3,193,598 | 7/1965 | Schafer | 264/54 |
| 3,194,708 | 7/1965 | Fourcade et al. | 428/308.4 |
| 3,355,535 | 11/1967 | Hain et al. | 428/311.5 |
| 3,400,196 | 9/1968 | Le Roy | 428/311.5 |
| 3,516,675 | 6/1970 | Kuester et al. | 273/176 |
| 3,518,156 | 6/1970 | Windecker | 428/320.2 |
| 3,519,228 | 7/1970 | Windecker | 244/123 |
| 3,567,568 | 3/1971 | Windecker | 428/316.6 |
| 3,627,622 | 12/1971 | Vega | 428/317.1 |
| 3,867,221 | 2/1975 | Chant | 428/322.7 |
| 3,873,654 | 3/1975 | Smith | 428/317.7 |
| 3,879,245 | 4/1975 | Fetherston et al. | 156/245 |
| 3,906,137 | 9/1975 | Bauer | 428/316.6 |
| 3,944,704 | 3/1976 | Dirks | 428/322.7 |
| 3,975,492 | 8/1976 | McLean et al. | 264/263 |
| 4,013,102 | 3/1977 | DeLorean et al. | 138/144 |
| 4,026,747 | 5/1977 | DeLorean et al. | 428/322.7 |
| 4,034,137 | 7/1977 | Hofer | 428/322.7 |
| 4,042,746 | 8/1977 | Hofer | 428/322.7 |
| 4,124,670 | 11/1978 | Cecka et al. | 264/45.3 |
| 4,136,226 | 1/1979 | Gilman | 428/318.8 |
| 4,200,677 | 4/1980 | Bottini et al. | 428/318.4 |
| 4,201,815 | 5/1980 | Weiland et al. | 428/113 |
| 4,205,111 | 5/1980 | Pip et al. | 428/319.1 |
| 4,250,136 | 2/1981 | Rex | 428/322.7 |
| 4,302,155 | 11/1981 | Grimes et al. | 416/144 |
| 4,479,998 | 10/1984 | Belbin et al. | 428/220 |
| 4,647,492 | 3/1987 | Grant et al. | 428/294 |

FOREIGN PATENT DOCUMENTS

| | | | |
|---|---|---|---|
| 1184106 | 3/1985 | Canada | 428/319.7 |
| 47229 | 3/1982 | European Pat. Off. | 428/319.7 |

OTHER PUBLICATIONS

Dictionary of Scientific and Technical Terms, 3rd Ed., N.Y., McGraw-Hill, pp. 81, 853.

Primary Examiner—William J. Van Balen
Attorney, Agent, or Firm—Pollock, VandeSande & Priddy

[57] ABSTRACT

A lightweight energy-absorbing structure is comprised of a laminate including a plurality of fabrics, preimpregnated with a thermosetting resin, abutting against a core of cellular foam treated with a charge of filled bonding material. The resulting mixed materials are compressed between two die members while heat is applied to the dies thereby single curing the thermosetting resin and bonding material. Individual sheets of fabric may have a predetermined orientation to increase impact resistance. In a preferred embodiment polyimide open-cell foam may be employed.

2 Claims, 2 Drawing Sheets

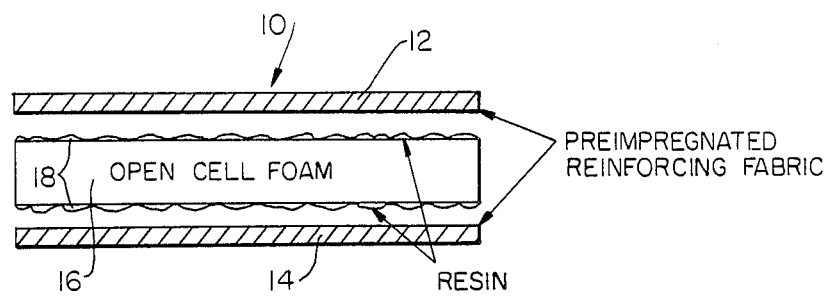
FIG. IA
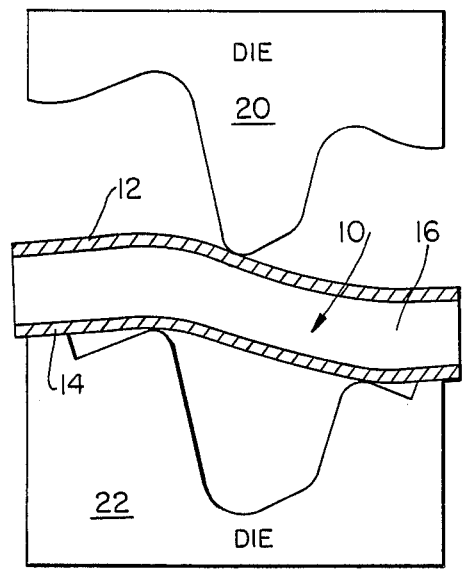
FIG. IB
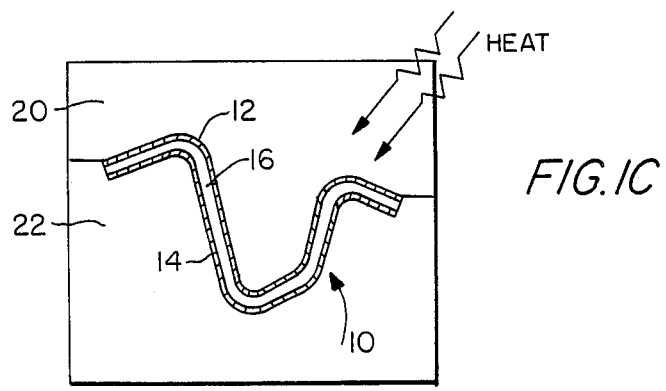
FIG. IC

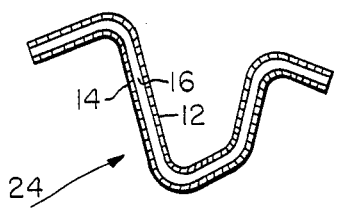
FIG. ID
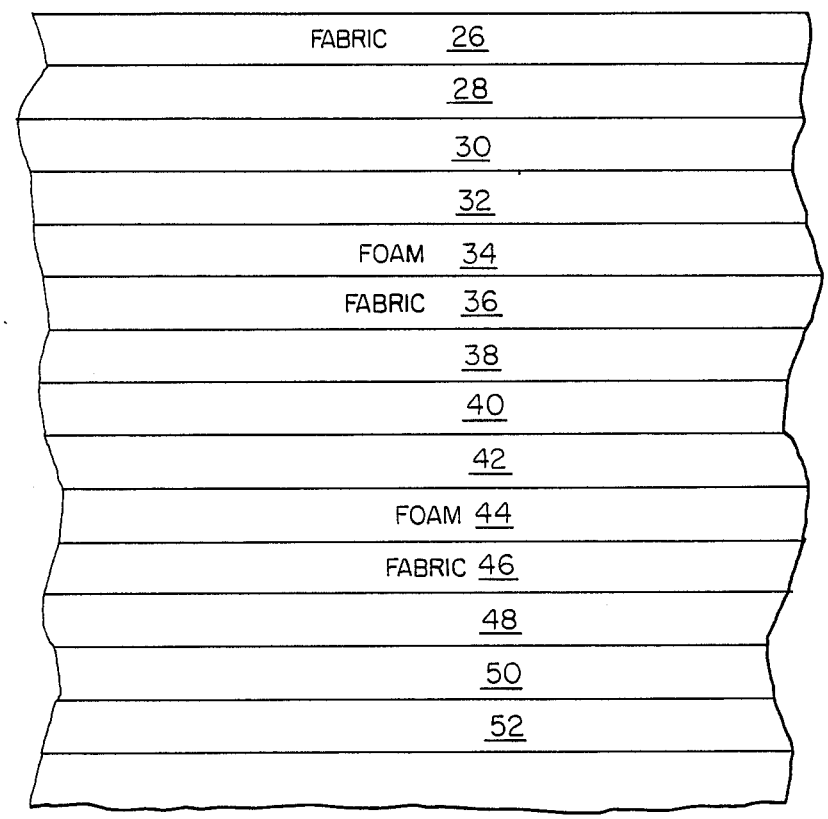
FIG. 2

ENERGY ABSORBING FOAM-FABRIC LAMINATE

This application is a continuation of application Ser. No. 768,589, filed 8/23/85, now abandoned.

FIELD OF THE INVENTION

The present invention relates to the manufacture of laminated structures and more particularly to bonded structures utilizing pre-impregnated fabric sheets and cellular material.

BACKGROUND OF THE INVENTION

In the past, lightweight laminates have been utilized for complex-shaped structures such as aircraft and missile fuselage and wing panels. Traditionally, lightweight panels of this type have been formed from a plurality of stacked fabric sheets made from material such as fiberglass. Prior to the stacking of each sheet, it is covered with an appropriate resin material and the layers are built up one at a time. Then, great pressure is brought to bear upon the laminate, often requiring the use of an autoclave to and secure adequate bonding during curing.

More recent developments in the field have introduced foam layers in between fabric layers, as described in U.S. Pat. No. 4,034,137, issued July 5, 1977, to Hofer. In this patent, improved lightweight, high strength panels capable of flat or curved construction are constructed from laminated sheet structures comprising resilient open-celled organic resin foam impregnated with a thermosetting resin and compressed and bonded to surface layers of resin-impregnated fiber materials such as unidirectional graphite or fiberglass matted or woven cloth.

Although the disclosed method in the mentioned patent is an improvement over the earlier prior art, it necessitates the impregnation of each fabric layer of the laminate prior to the layer-by-layer buildup of the complete structure. This is quite time consuming and requiers special care to ensure satisfactory bonding between the foam layer and the sheets of fabric.

BRIEF DESCRIPTION OF THE INVENTION

The present invention is an improvement over the recent prior art as previously discussed. The advance of the present invention is the utilization of individual separated layers of cellular material (foam), the separation between these layers occupied by multiple sheets of pre-impregnated fabric, such as fiberglass.

The foam is initially impregnated with a selected charge of a thermosetting resin (including hot melt resin systems) and forms the core of the laminated structure to be molded. The pre-impregnated fabric sheets are sandwiched between separated layers of the foam and the resulting wet laminate is compressed by platen press pressure simultaneous with the application of heat to achieve curing. During this time, the foam is compressed releasing the resin with which it was impregnated which in turn forces the resin into the surrounding fabric. In this manner the resin of the impregnated foam contacts the pre-impregnating material of the fabric in preparation for bonding. During compression of the layers of foam and fabric, heat is applied to achieve single curing of the foam resin and the pre-impregnation material of the fabric. The resultant laminated structure is a tough durable structure with strong reinforcement by the fabric and a dense, rigid impact-resistant foam center.

By utilizing pre-impregnated fabric sheets, it is unnecessary to individually impregnate each sheet, thereby ensuring greater uniformity of the bonding materials throughout the laminated structure and completely eliminating the time-consuming in situ manual impregnation of the sheets as practiced by the prior art.

BRIEF DESCRIPTION OF THE FIGURES

The above-mentioned objects and advantages of the present invention will be more clearly understood when considered in conjunction with the accompanying drawings, in which:

FIG. 1A is a simplified cross section of a laminated structure in accordance with the present invention;

FIG. 1B is a simplified schematic illustration of a molding process in accordance with the present invention;

FIG. 1C is a simplified schematic illustration indicating completion of a molding process in accordance with the present invention;

FIG. 1D is a simplified cross sectional view of a contoured molded structure resulting from the method of the present invention;

FIG. 2 is a schematic illustration of the individual layers and sheets comprising a laminated structure formed in accordance with the present invention.

DETAILED DESCRIPTION OF THE INVENTION

Referring to the drawings, and more particularly FIG. 1 thereof, a simplified schematic view of a disassembled laminated structure, in accordance with the present invention, is shown. Reference numeral 10 generally defines the laminate. It is comprised of parallel spaced, pre-impregnated fabric sheets 12 and 14 sandwiching a centrally located cellular foam layer 16, for example, an open-cell foam made of heat-resistant polyimide, although closed cells foams may be used. The initially exposed surfaces 18 of the foam layer are covered by resin as indicated. The resin is of a conventional thermosetting type compatible with the pre-impregnation material of the fabric sheets. In the event the fabric sheets were to be made of graphite, a suitable thermosetting resin is the type manufactured by the Hercules Corporation and currently designated as material No. 3501-5A. However, the cellular foam material may be impregnated with a charge of other thermosetting resins, including hot melt resin systems, depending upon the material of the foam with which it must be compatible.

The fabric sheets may be comprised of Kevlar, fiberglass or graphite material; and suitable pre-impregnated fabrics are available commercially from sources such as the 3M Corporation.

In order to demonstrate the method of the present invention to form a resulting laminate, reference is made to FIG. 1B wherein a lower fabric sheet is positioned over die 22 followed by the positioning of cellular foam layer 16 thereover. The foam layer is covered by a second pre-impregnated fabric sheet 12 thereby permitting the upper illustrated die member 20 to mold the wet laminate 10. In FIG. 1C the dies 20 and 22 are seen in a pressure-bearing molding position wherein the wet laminate 10 conforms to the molding shape of the dies. It should be pointed out that the impregnating resin of the foam may be applied to the foam material using standard manual or automated processes. When the dies are closed by platen press pressure, as shown in FIG. 1C, the cellular material compresses and releases the thermosetting resin which, in turn, is forced into the fabric sheets 12 and 14. As a result of this pressure, the fabric sheets become impregnated with the resin and excess resin is exuded from the dies, along with reaction gases and air. The impregnating thermosetting resin and composite pre-impregnation material of the fabric sheets are single cured in the enclosed dies by the application of heat. The specific cure cycles are developed for a given impregnating resin/pre-impregnating material combinations and are easily determined. After the dies are open, the finished laminated structure may be removed to replicate the molding contours of the dies, as illustrated in FIG. 1D by structure 24. The result will be a tough, durable structure with fabric sheet/resin faces and a dense, rigid impact-resistant foam center.

Although the invention has, up to this point, been discussed in connection with a simple single foam layer sandwiched between two pre-impregnated fabric sheets, the impact resistance of structures is best realized by utilizing interleaving layers of foam and pre-impregnated fabric, as indicated in FIG. 2. Typically, a first foam layer 34 may have a plurality of pre-impregnated fabric sheets 26, 28, 30 and 32 positioned on top while a similar plurality of fabric sheets 36, 38, 40 and 42 are positioned beneath. The individual sheets have their orientations altered relative to one another so that the strength of the resultant structure is greater than if the orientation of the interleaving fabric sheets were the same. The orientation may be repeated for each series of interleaving fabric sheets above and below an intermediate foam layer. Thus, by way of example in FIG. 2, the orientation of fabric sheet 36 may be the same as that of 26, while correlations of orientation continue between fabric sheets 28–38, 30–40, and 32–42. Similarly, the fabric sheets below the foam layers 34 and 44 are repeated so that orientation correlation results between fabric sheets 36–46, 38–48, 40–50, and 42–52.

In a typical laminate forming process as shown by example in FIG. 1C, graphite fabric sheets were employed in connection with an open-cell polyimide foam layer 16 for one hour. The 3501-5A resin previously identified as impregnating the foam was single cured with the pre-impregnation material of the fabric sheets during this time and while being subjected to temperatures ranging from 250°–350° F. Relatively low pressure can be employed, such as 45 psi. As a result one is able to use less expensive and more expendable die material, such as fiberglass, as opposed to machined steel or aluminum.

In the event that the present application is employed for aerospace applications, advantages over prior art structural panels include lower cost, greater impact resistance and hydrodynamic ram resistance, as well as low weight and excellent corrosion resistance.

Prototype structures have demonstrated excellent flexural and horizontal shear strength values and low moisture absorption. When Kevlar and fiberglass fabrics are used, there is a significant reduction in radar cross section.

It should be understood that the invention is not limited to the exact details of construction shown and described herein for obvious modifications will occur to persons skilled in the art.

We claim:

1. A method for forming a lightweight laminated structure comprising the steps:

impregnating opposite surfaces of a layer of open cellular material with a charge of thermosetting resin;

stacking a first plurality of fabric sheets, preimpregnated with bonding material, against a first surface of the cellular layer; wherein each sheet has an altered preselected orientation relative to an adjacently stacked sheet;

stacking a second plurality of fabric sheets, preimpregnated with bonding material, against an opposite surface of the cellular layer; wherein each sheet of the second plurality of sheets has an altered preselected orientation relative to an adjacently stacked sheet, but an identical orientation to a corresponding sheet in the first plurality of fabric sheets;

subjecting all the sheets and the layer to pressure from die members which bond them together while molding the structure to a predetermined finished contour; and applying heat and the pressure simultaneously for single curing the resin and impregnated material, while molding occurs, to form an impact-resistant structure.

2. The method set forth in claim 1 wherein a plurality of spaced cellular layers is individually deposited between alternating first and second pluralities of fabric sheets.

* * * * *